(12) United States Patent
Carey et al.

(10) Patent No.: US 6,584,475 B1
(45) Date of Patent: Jun. 24, 2003

(54) SYSTEM FOR CONTROLLING DATABASE GROWTH IN A READ-REPEATABLE ENVIRONMENT

(75) Inventors: James E. Carey, Brookline, MA (US); Charles P. Venezia, Jr., Marlborough, MA (US); Albert Hopeman, Arlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/465,191

(22) Filed: Dec. 15, 1999

(51) Int. Cl.[7] .............................................. G06F 12/00

(52) U.S. Cl. ...................................................... 707/203

(58) Field of Search ................................ 707/203, 205, 707/8, 206

(56) References Cited

U.S. PATENT DOCUMENTS

| | | | | |
|---|---|---|---|---|
| 5,881,292 A | * | 3/1999 | Sigal et al. | 707/200 |
| 5,956,713 A | * | 9/1999 | Bamford et al. | 707/201 |
| 5,956,719 A | * | 9/1999 | Kudo et al. | 707/10 |
| 6,138,118 A | * | 10/2000 | Koppstein et al. | 705/26 |
| 6,167,407 A | * | 12/2000 | Nachenberg et al. | 707/101 |

* cited by examiner

*Primary Examiner*—Safet Metjahic
*Assistant Examiner*—Haythim J. Alaubaidi
(74) *Attorney, Agent, or Firm*—Hamilton, Brook, Smith & Reynolds, PC

(57) ABSTRACT

Growth of databases in read-repeatable environments is controlled by an erase list maintained for each generation of the database. The erase list identifies pages which are retained in the database to facilitate read repeatability. The system uses the erase list to identify obsolete pages which can be removed from the database. The removed pages can then be reclaimed for re-use by a subsequent generation.

49 Claims, 11 Drawing Sheets

SYSTEM FOR CONTROLLING DATABASE GROWTH IN A READ-REPEATABLE ENVIRONMENT

BACKGROUND

In a typical database system, multiple users access or are "attached" to a database at a single time. To provide read-repeatability in the database environment, each user attached to the database is provided a view of the database which remains unaffected by transactions of other users which modify the contents or structure of the database during a period of attachment by the initial user.

Generally, to maintain this read-repeatability, the database server maintains multiple versions or generations of a database, each reflecting a view of the database held by one or more users. As an update is made to the database, a new generation of the database is provided and a user attaching to the database subsequent to the update but prior to the next update attaches to the new generation.

Each generation includes one or more pages (or records) which provide the various values of the database table columns. A page is a unit of allocation, typically 4 k bytes or 8 k bytes, by which the information within the database is made available to a user. As updates are made to the database, these pages are superceded by subsequent versions of the page which reflect the changes made by the most recent update. In some instances, a difference between a new generation and its immediate predecessor may be a single change in one of these pages—the remaining records which make up the two generations remaining identical.

A superceded page is maintained within the system until there are no users attached to a generation which references the superceded page. The superceded pages are erased when they are no longer referenced by attached users. One prior approach for identifying an instance during which no users are attached to a generation is to identify a time when no users are attached to the database. At this identified time when no users are attached, all superceded pages are erased and only a single, most recent generation of the database is retained. An extension to this approach is to erase these superceded pages upon first reference to a database.

SUMMARY

In a typical database environment, instances during which no users are attached to the system occur infrequently. As a result, obsolete pages may be seldom erased yielding uncontrolled growth of the database as remnants of prior, inactive generations are saved.

A system and method for controlling database growth in a read-repeatable environment includes, for a given active generation, an indication of the pages allocated in that active generation which are updated by a subsequent generation of the database. From that indication, obsolete pages can be determined and removed from the database, possibly being reclaimed for re-use by the database.

In particular, a system and method controls database growth in a read-repeatable environment having a database comprising a plurality of pages of memory. The database can concurrently support a plurality of active ordinal generations, each active generation represented by a respective plurality of allocated pages. The method can be embodied in a computer readable medium for distribution.

The database is managed via a hierarchy of control structures. A global control structure stores information relevant to a global view of the database. Under the global control structure can be a plurality of generation control structures, each storing information relevant to a respective ordinal generational view of the database. The hierarchy can be further extended to include structures for managing, for example, local and session level views of the database.

The global control structure includes a reference, such as a pointer, to the latest active (current) generation of the database. The global control structure also includes a global erase indicator which identifies those pages of the database which are obsolete and can be removed from the database. The global erase indicator can be a bitmap field.

The generation control structure includes a reference, such as a pointer, to the prior active (ancestor) generation of the database. The global control structure also includes an allocation indicator and a generation erase indicator, which can both be bitmap fields. The allocation indicator identifies the pages which are allocated to the generation, while the generation erase indicator identifies which of the allocated pages have been updated by a subsequent generation of the database. The generation control structure can also include a user count, or other mechanism, to determine when the generation no longer has users accessing the data for the generation.

For each active generation of the database, an indication of each page allocated in the active generation is stored in the allocation indicator, and an indication of each allocated page of the active generation updated by a subsequent generation is stored in the erase indicator. These indicators can be bitmap fields in the control structure for each active generation.

From a generation erase indicator, an obsolete page can be determined. That process can be triggered by the process of detaching a final accessor (user) from the active generation. In particular, the indication of an updated page from the erase indicator of an active generation can be merged with the erase list of an active ancestor generation. Furthermore, the indication of an updated page from the erase indicator of an active generation can be merged with the global erase indicator. The active generation can then be de-activated.

Once identified, the obsolete page can be reclaimed for reuse by the database. The obsolete pages can be found in the global erase indicator. Upon creating a new generation, the global erase indicator can be processed to remove the pages from the database.

By utilizing generation erase indicators and a global erase indicator, obsolete pages of the database can be identified and removed from the database while users are attached to the database. As such, there is no longer a need to wait for a period of non-access before reclaiming obsolete pages. Run-time database growth can therefore be controlled while permitting read-repeatability of the database.

BRIEF DESCRIPTION OF THE DRAWINGS

The foregoing and other objects, features and advantages of the invention will be apparent from the following more particular description of a System For Controlling Database Growth in a Read-Repeatable Environment, as illustrated in the accompanying drawings in which like reference characters refer to the same parts throughout the different views. For clarity and ease of description, the drawings are not necessarily to scale, emphasis instead being placed upon illustrating the principles of the invention.

DETAILED DESCRIPTION

Figure 1:
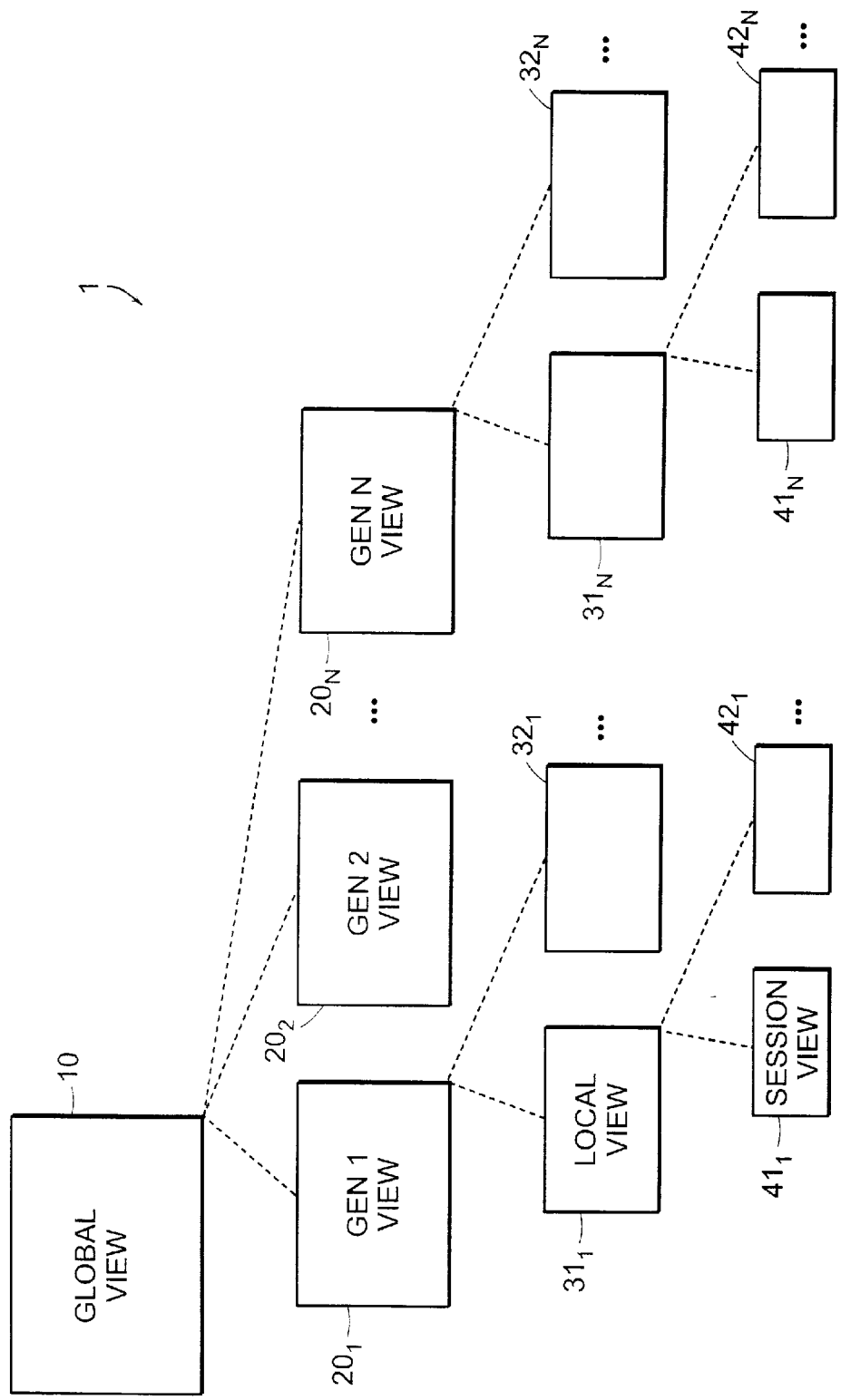
FIG. 1 is a block diagram of a particular read-repeatable database environment.

FIG. 1 is a block diagram of a particular read-repeatable database environment. As illustrated, the environment 1 includes four levels of views of the database for a particular user session. There is a global view level 10, a generation view level 20, a local view level 30, and a session view level 40. The global view 10 is a singular view into the server wide physical file holdings the database. Each generation view $20_1 \ldots 20_N$ is a read only view of a particular ordinal version (generation) of the database. Each local view $31,32_1$, ... is a private database view of the database for a particular user, which permits both read and write access to the database data. Each session view $41_1,42, \ldots$ stores caching information specific to a user thread. As shown, the global view 10 can include a plurality of a generation views $20_1 \ldots 20_N$. Likewise, each generation view $20_1 \ldots 20_N$ can include a plurality of local views $31_1,32_1, \ldots 31_N,32_N$, and each local view can include a plurality of session views $41_1,42_1, \ldots 41_N,42_N$ Further details of the particular database environment can be found in U.S. patent application No. 08/866,619, entitled "Computing System For Implementing a Shared Cache" by James E. Carey, the teachings of which are incorporated herein by reference in their entirety.

Figure 2:
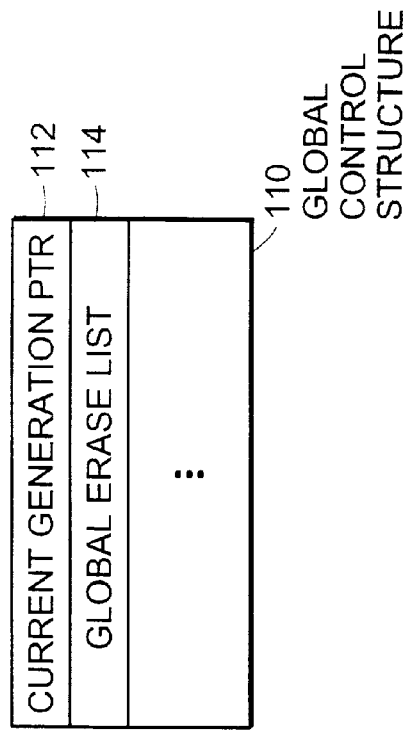
FIG. 2 is a block diagram of a Global Control Structure for the environment of FIG. 1.

FIG. 2 is a block diagram of a Global Control Structure for the environment of FIG. 1. As shown, the Global Control Structure 110 includes a current generation pointer 112 and a global erase list 114. The current generation pointer 112 is a pointer, or other referencing technique, which de-references to a Generation Control Structure (FIG. 3) for the latest version of the database. The global erase list 114 is a bitmap (one bit for each page in the database) of pages which has been superseded by a subsequent version of the database.

In a particular embodiment of the system, any change or update to the database causes the creation of a new database generation. If data on an existing page is modified, that data is first copied to a new page. The modifications actually occur in the new page. The new generation includes the new modified page but not the pre-existing page.

Figure 3:
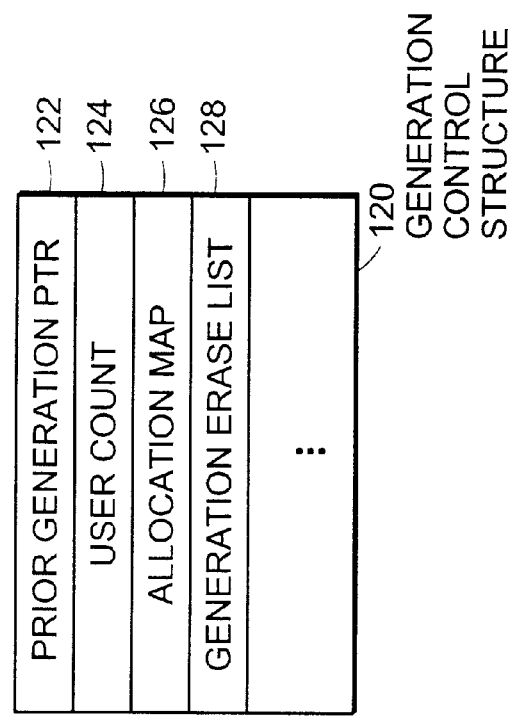
FIG. 3 is a block diagram of a Generation Control Structure for the environment of FIG. 1.

FIG. 3 is a block diagram of a Generation Control Structure for the environment of FIG. 1. As shown, the Generation Control Structure 120 includes a prior generation pointer 122, a user count field 124, an allocation map 126, and a generation erase list 128. The prior generation pointer 122 is a pointer, or other referencing technique, which de-references to a Generation Control Structure for the ancestor version of the database. As described below, the ancestor version is the next most recent version of the database which is being accessed. The user count field 124 maintains the current number of users having at least read access to this version of the database. The allocation map 126 is a bitmap of pages in this version the of the database. The generation erase list 128 is a bitmap of pages in the database which have been superseded by a later version of the database.

Figure 4:
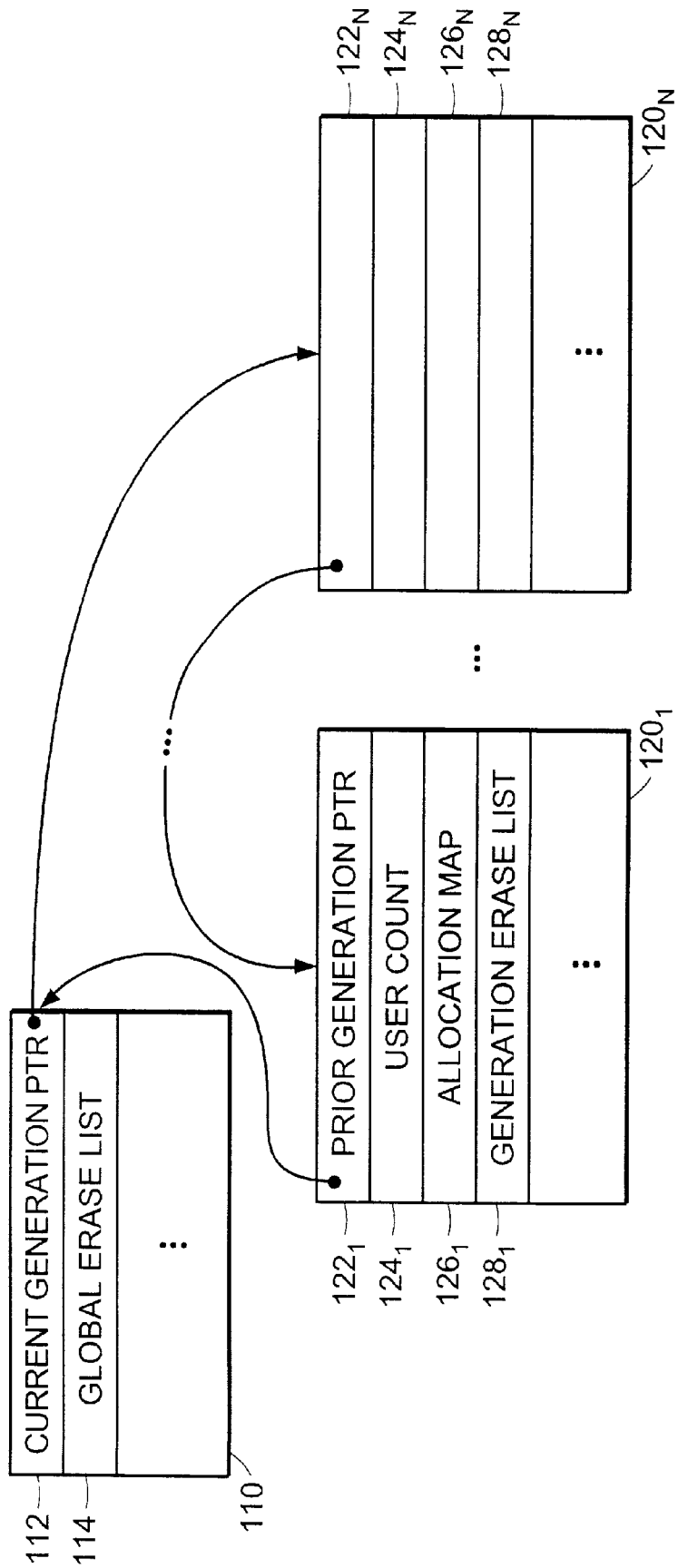
FIG. 4 is a block diagram of the relationships between the Global Control Structure of FIG. 2 and the Generation Control Structure of FIG. 3.

FIG. 4 is a block diagram of the relationships between the Global Control Structure of FIG. 2 and the Generation Control Structure of FIG. 3. The current generation pointer 112 references the Generation Control Structure for the most recent generation of the database. The prior generation pointer 122 points to the generation control structure for the ancestor generation, if one exists. Eventually, the prior generation pointer 122 references the Global Control Structure 110. As illustrated, the pointers point to the address of the other pointers making a linked list, however it should be understood that the pointers can reference a common location anywhere in a structure, with an offset used to locate various fields within the structure, such as the pointers.

Figure 5:
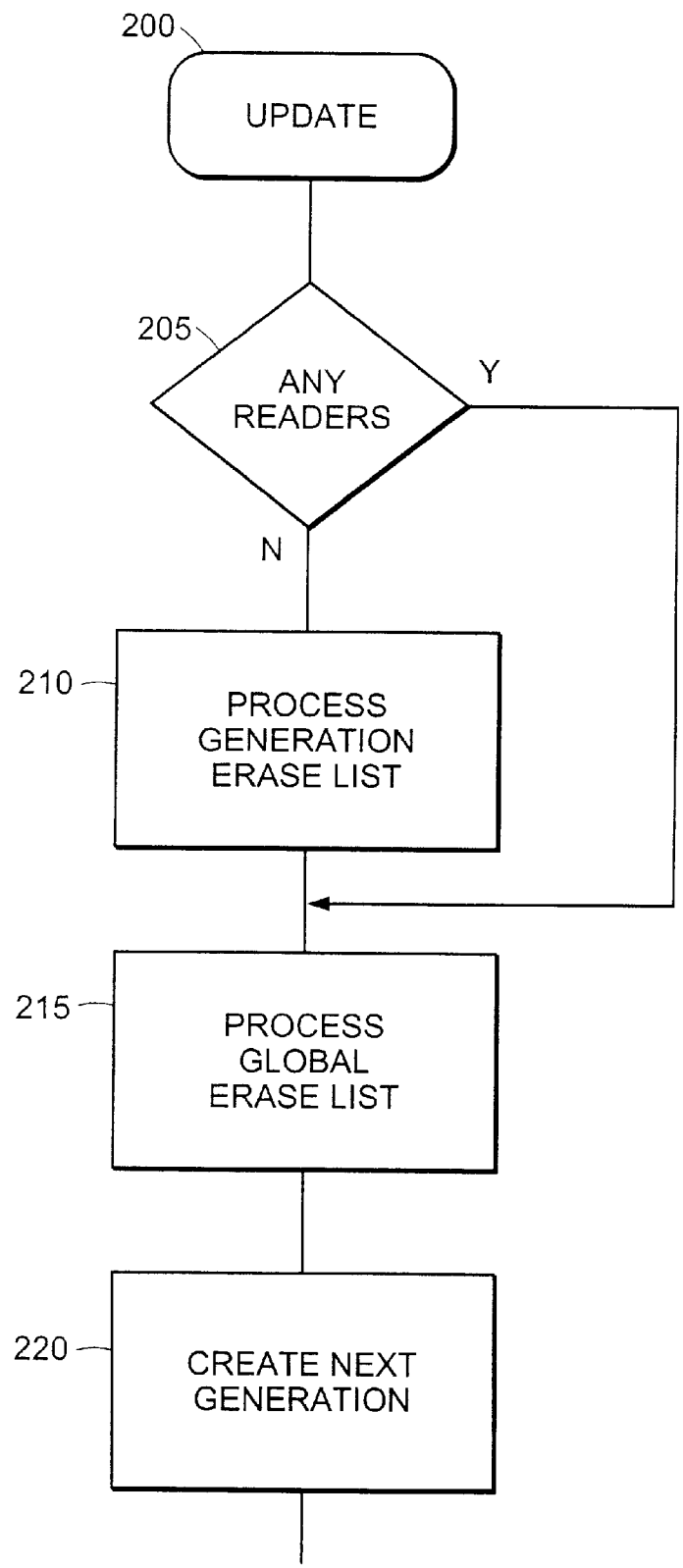
FIG. 5 is a flow chart of a method for updating a database to create a new generation.

FIG. 5 is a flow chart of a method for updating a database to create a new generation. The update method 200 includes a check to determine whether there are any readers of the current database generation, at step 205. If there are active readers, processing jumps to step 215. If there are no active readers, processing continues to step 210.

At step 210, the current generation erase list 128 is processed. In particular, the allocation map 126 and the generation erase list 128 are exclusive OR'ed, which removes the resulting pages from the database. Processing continues to step 215.

At step 215, the global erase list 114 is processed. Any page on the global erase list 114 is erased from the database. Processing then continues to step 220, where the next generation of the database is created. This causes the current generation pointer 112 to be updated, essentially placing the Generation Control Structure 120 for the new generation at the head of the previously-described linked list.

Figure 6:
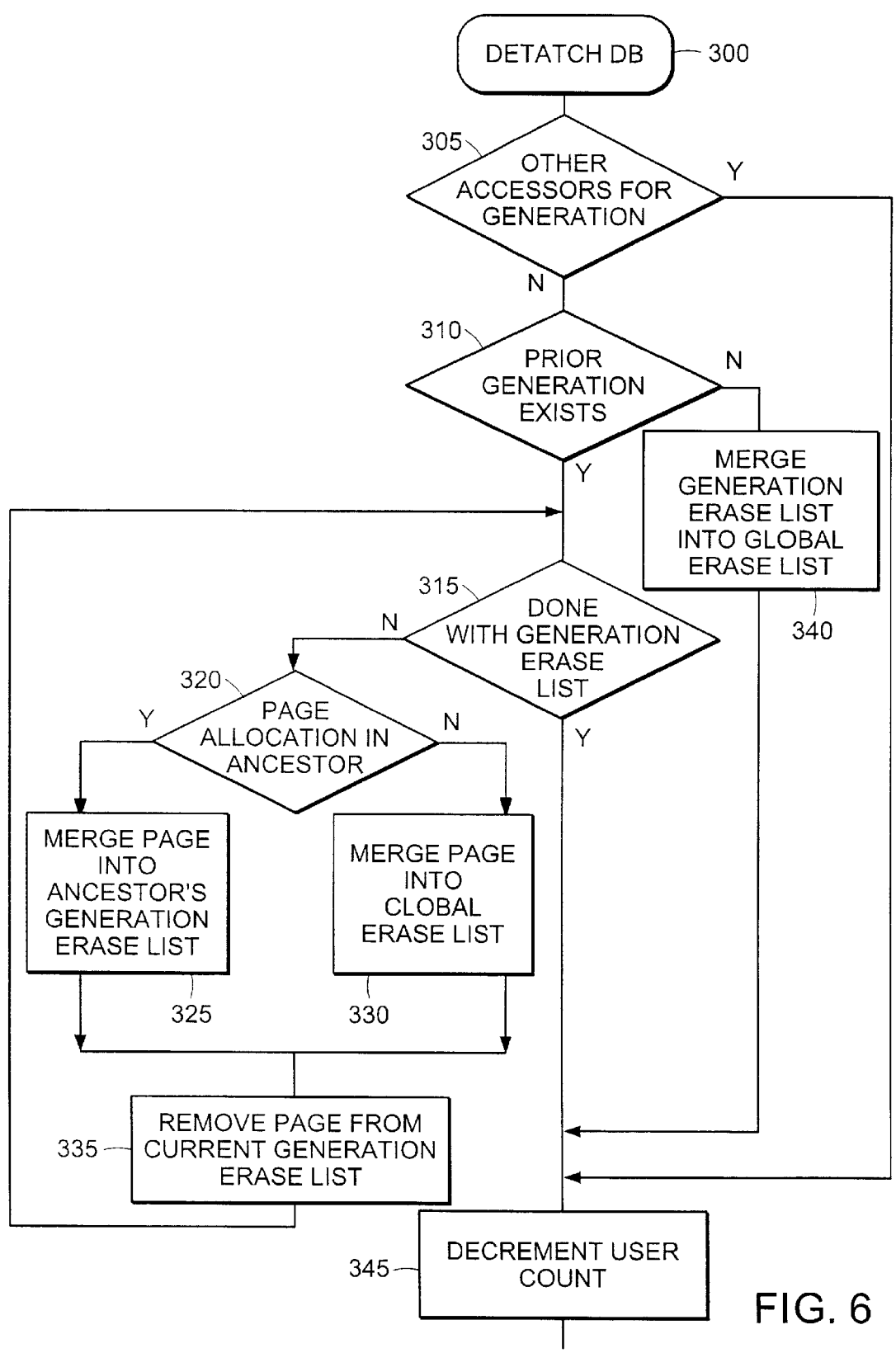
FIG. 6 is a flow chart of a method for detaching a user from a database generation.

FIG. 6 is a flow chart of a method for detaching a user from a database generation. If the detaching method 300 include or other users for the current generation of the database. If there are other users, processing jumps to step 345. Otherwise, processing continues to step 310.

At step 310, a check is made to determine whether a prior generation of the database exists in the system. If not, then processing jumps to step 340, where the generation erase list 1128 is merged with the global erase list 114. Processing then continues to step 345. If a prior generation does exist at step 310, processing instead continues to step 315.

At step 315, processing begins a loop. If a page is in the generation erase list 128, processing continues to step 320; otherwise processing jumps to step 345.

At step 320, a check is made to determine whether the page is in the allocation map of the Generation Control Structure 120 pointed to by the prior generation pointer. If so, the page is merged into the prior generation erase list at step 325. If not, then the page is merged into the global erase list at step 330. In either case, processing continues to step 335.

At step 335, the page is removed from the current generation erase list. Processing then returns to step 315 to continue the loop. The loop is exited when there are no more records in the generation erase list at step 315.

At step 345, the user count for the current generation is decremented to reflect the detached user. If the user count goes to zero, there are no more accessors for this generation, allowing the structure to be reused. In that case, cleanup of the Generation Control Structure can be performed here, or it can be initialized when later re-used.

FIGS. 7A–7F are block diagrams illustrating examples of the methods of FIGS. 5 and 6. The figures are simplified to facilitate a clearer description of the methods. For example, the only data fields shown are those that are necessary for the description many other fields may exist in the structure to meet other objectives. For clarity of description, the pages are labeled with an alphabetic indicator (pages A, B, . . . ) and each generation of the database allocates only three pages. In reality, each page would be referenced by a unique page number and each generation of the database would involve an variable allocation of pages, which could easily total in the thousands or millions pages. Also, although only four Generation Control Structure $110_1, \ldots, 110_4$ are shown there may be many more allocated for the database. Indeed, the number of Generation Control Structures 110 may not be fixed and could be determined dynamically.

Figure 7A:
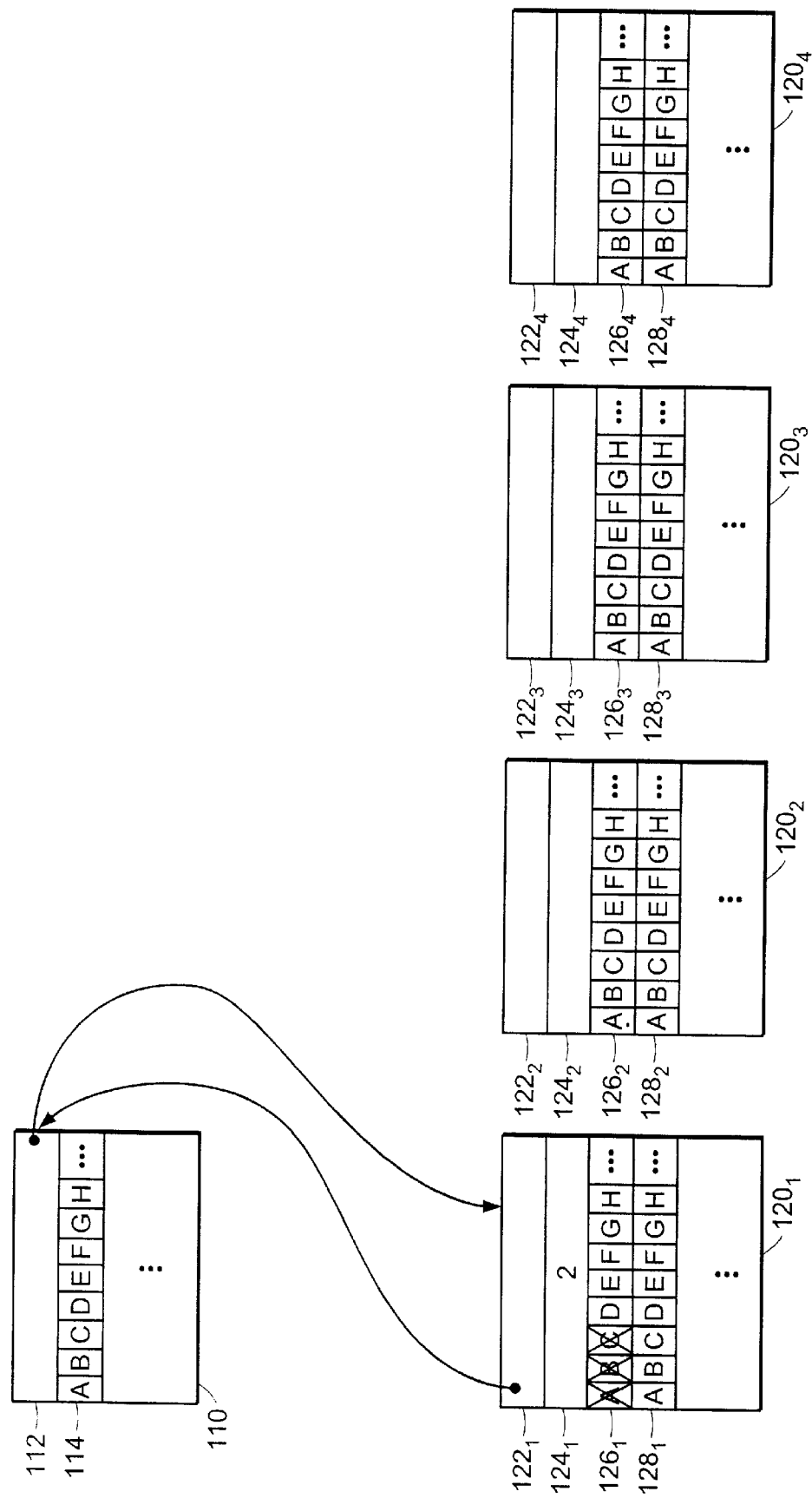
FIGS. 7A–7F are block diagrams illustrating examples of the methods of FIGS. 5 and 6.

Starting with FIG. 7A, there is a single generation of the database (generation 1). In the Global Control Structure 110, the current generation pointer 112 points to the Generation Control Structure $120_1$ for generation 1. Note that the global erase list 114 is empty, reflecting no pages that can be reclaimed. In the Generation Control Structure $120_1$, the previous generation pointer $122_1$ points to the Global Control Structure 110. For this example, there are two users accessing this generation of the database, which is reflected in the user count field $124_1$. As depicted in the allocation map field $126_1$, this generation of the database has three allocated pages (pages A, B, C). Note that the generation erase list $128_1$, is also empty.

Figure 7B:
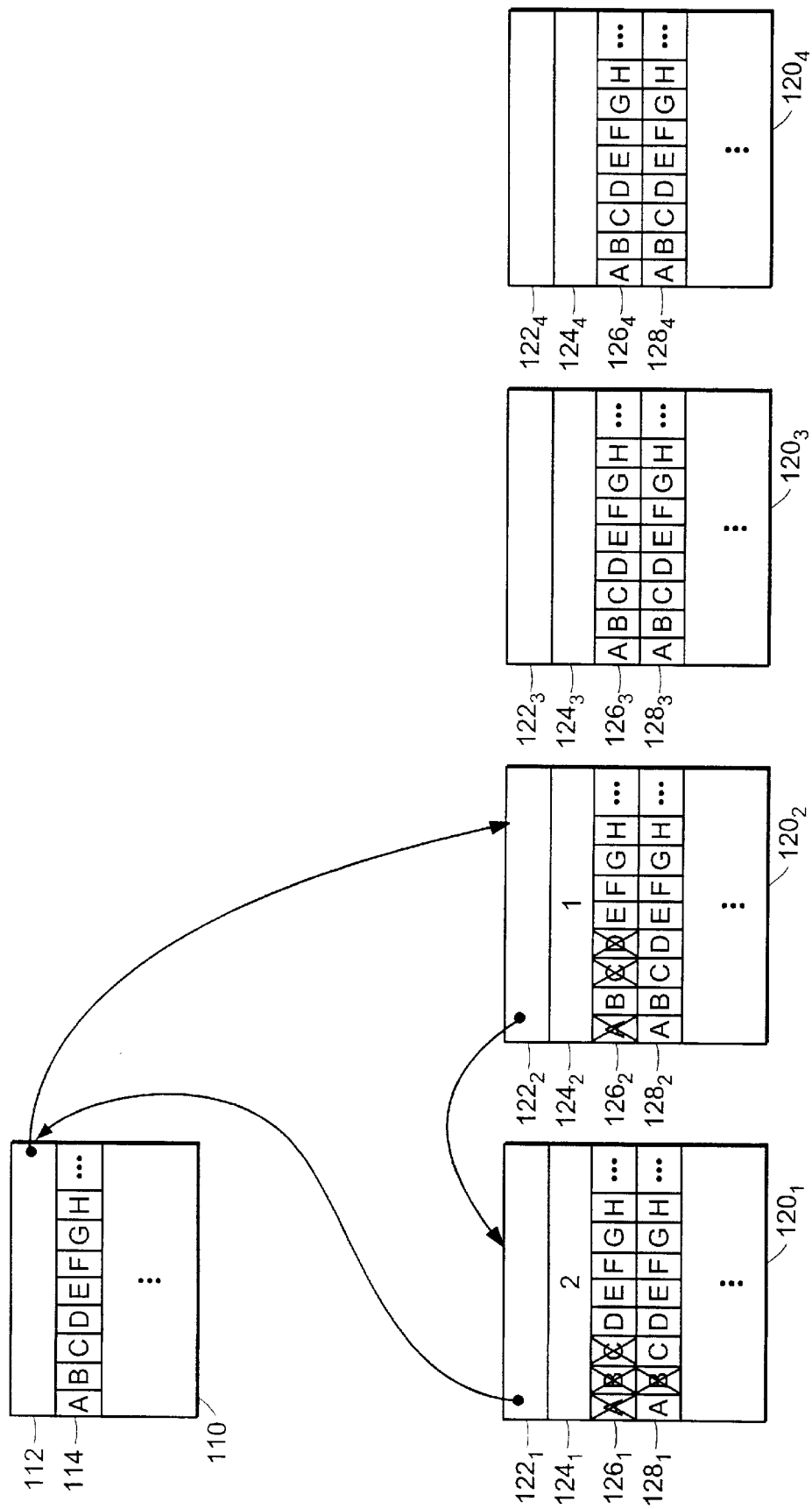

FIG. 7B illustrates an update to the database to generation 2. In particular, the data from page B is being modified as page D, the current generation pointer 112 now points to the Generation Control Structure $120_2$ for generation 2. The previous generation pointer $122_2$ for generation 2 points to the Generation Control Structure $120_1$ for generation 1. Because generation 2 includes a different page allocation (pages A, C, D), as reflected in the allocation map $126_2$, than that in generation 1, the erase list $128_2$ for generation 1 includes an entry for the page that is being made obsolete (page B) by generation 2. Note that the user count $124_2$ indicates that there is a single user accessing generation 2 of the database. Generation 1 is still being accessed by two users.

Figure 7C:
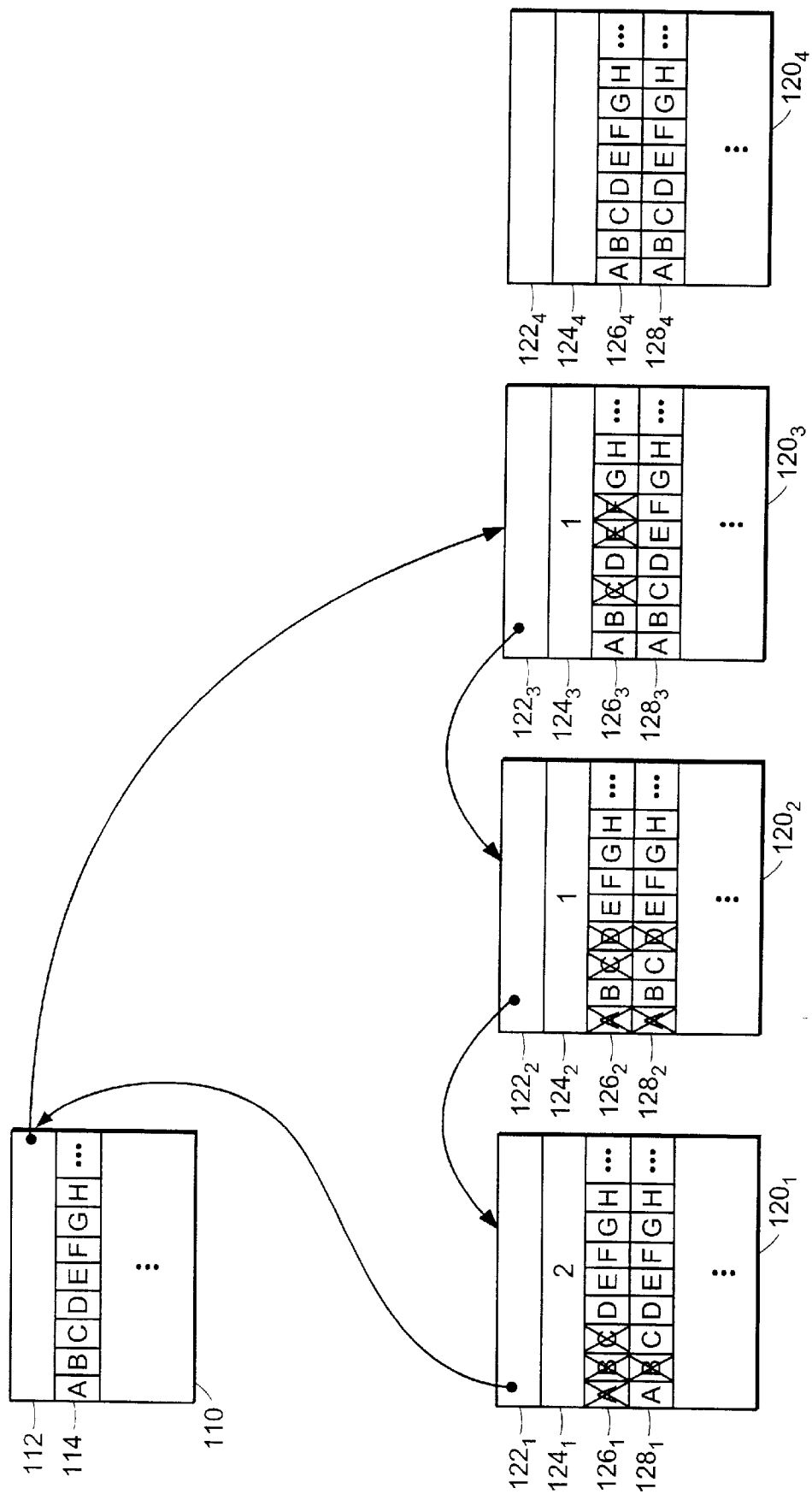

FIG. 7C illustrates an update to the database to create generation 3. In particular, the data from page A is being modified as page E and data from page D is being modified as page F. The current generation pointer 112 now points to the Generation Control Structure $120_3$ for generation 3. The previous generation pointer $122_3$ for generation 3 points to the Generation Control Structure $120_2$ for generation 2. Because generation 3 includes a different page allocation (pages C, E, F), as reflected in the allocation map $126_3$, than generation 2, the generation erase list $128_2$ for generation 2 includes entries for the pages that are being made obsolete by generation 3 (pages A, D). Note that the user count $124_3$ indicates that there is a single user accessing generation 3 of the database and the user count $124_1$ indicates that there is now a single user accessing generation 1 of the database.

Figure 7D:
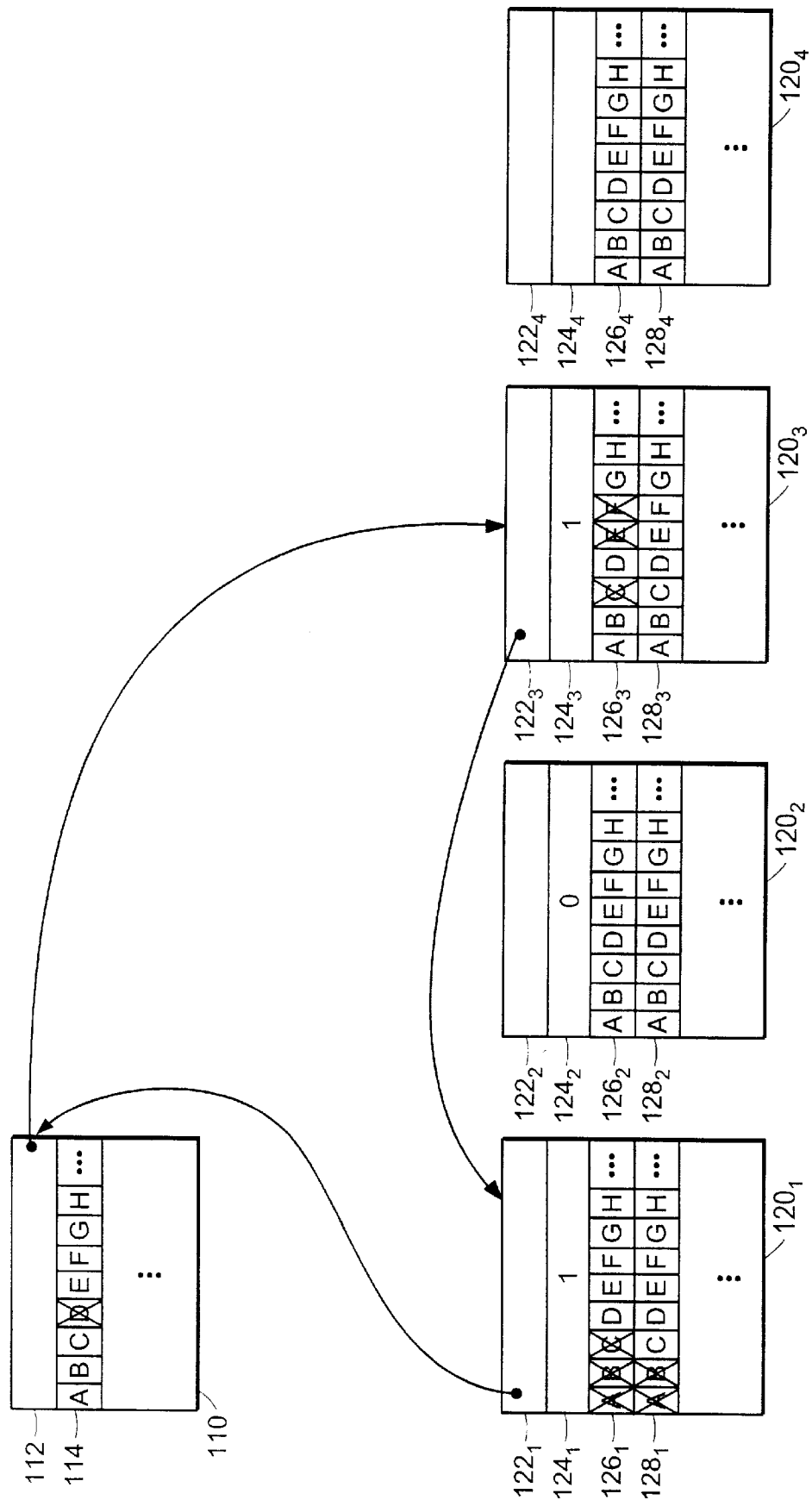

FIG. 7D illustrates the detachment of the user from generation 2 of the database. Because only a single user was accessing generation 2, the corresponding Generation Control Structure $120_2$ can be removed from the system. To manage the obsolete pages in generation 2, its erase list $128_2$ must be merged with the ancestor generation's erase list, which is determined by the prior generation pointer $122_2$. To the extent that any page on the erase list $128_2$ for generation 2 is allocated in the ancestor generation allocation map $126_1$, the page is AND'ed with the ancestor generation's erase list $128_1$. As shown, page A is merged into the erase list $128_1$ and removed from the generation erase list $128_2$ of generation 2.

For pages in the erase list $128_2$ for generation 2 which are not allocated in any ancestor generation, the page no longer needs to be maintained. As such, those pages can be merged with the global erase list 114. As shown, page D is AND'ed with the global erase list 114. In other words, paged D can be purged from the database upon the next update (or other opportunity). Page D is also removed from the generation erase list $128_2$ of generation 2.

Next, the user count $124_2$ for generation 2 is decremented to zero. The Generation Control Structure $120_2$ for generation 2 can now be cleaned up. In particular, the allocation map $126_2$ is cleared and the Generation Control Structure $120_2$ for generation 2 is removed from the linked list. The allocated storage space for this control structure can now be reused for a subsequent generation.

Figure 7E:
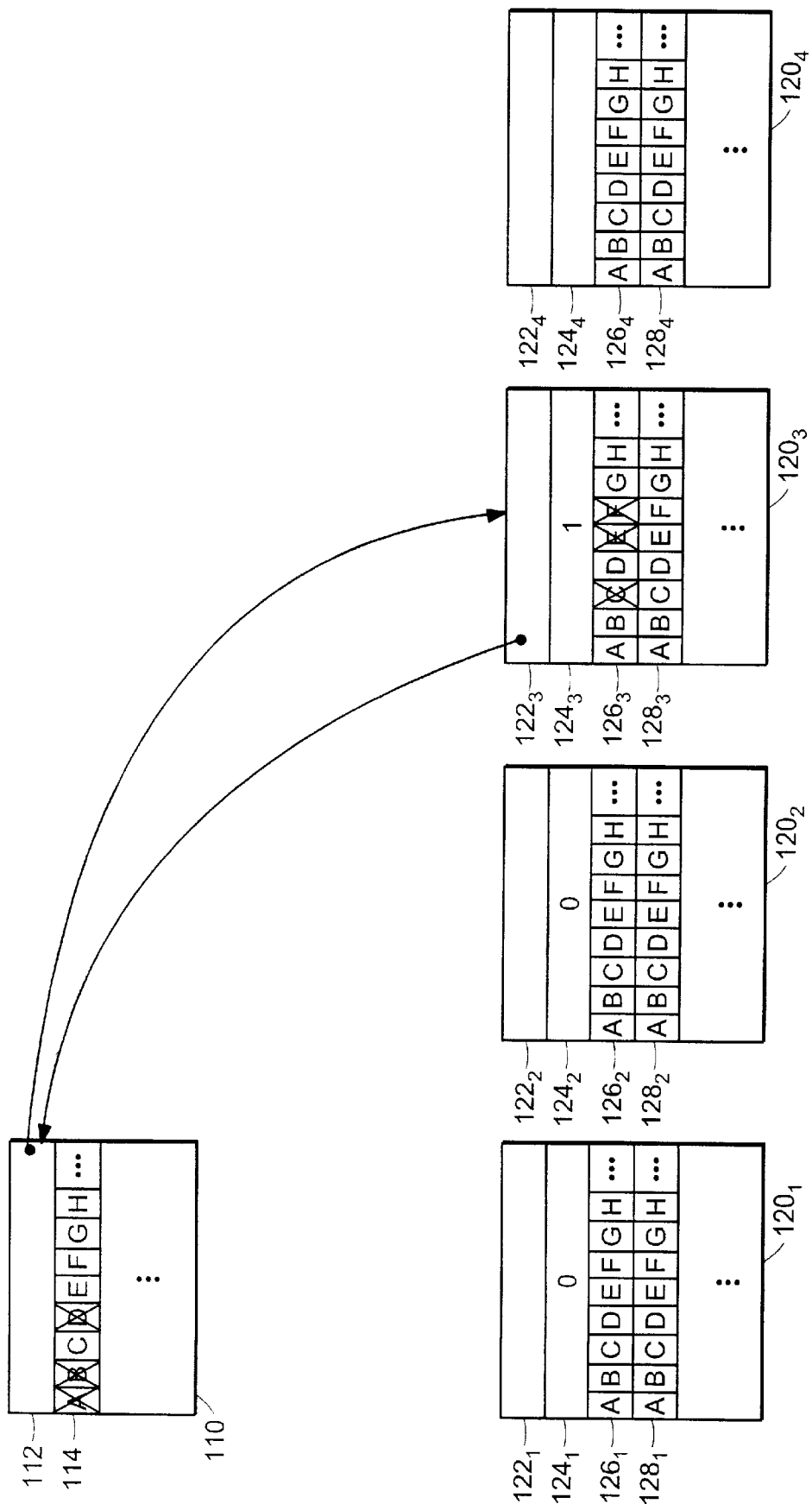

FIG. 7E illustrates the detachment of generation 1. Because generation 1 is the oldest accessed generation, its prior generation pointer $122_1$ de-references to the Global Control Structure 110. Consequently, the pages on the generation erase list 128, (pages A, B) are merged (AND'ed) into the global erase list 114, as illustrated. In other words, pages A, B and D are no longer being used and can be reclaimed. As shown, the control structure for generation 1 is cleaned up for reuse.

The database now has a single generation, generation 3, allocating pages C, E and F.

Figure 7F:
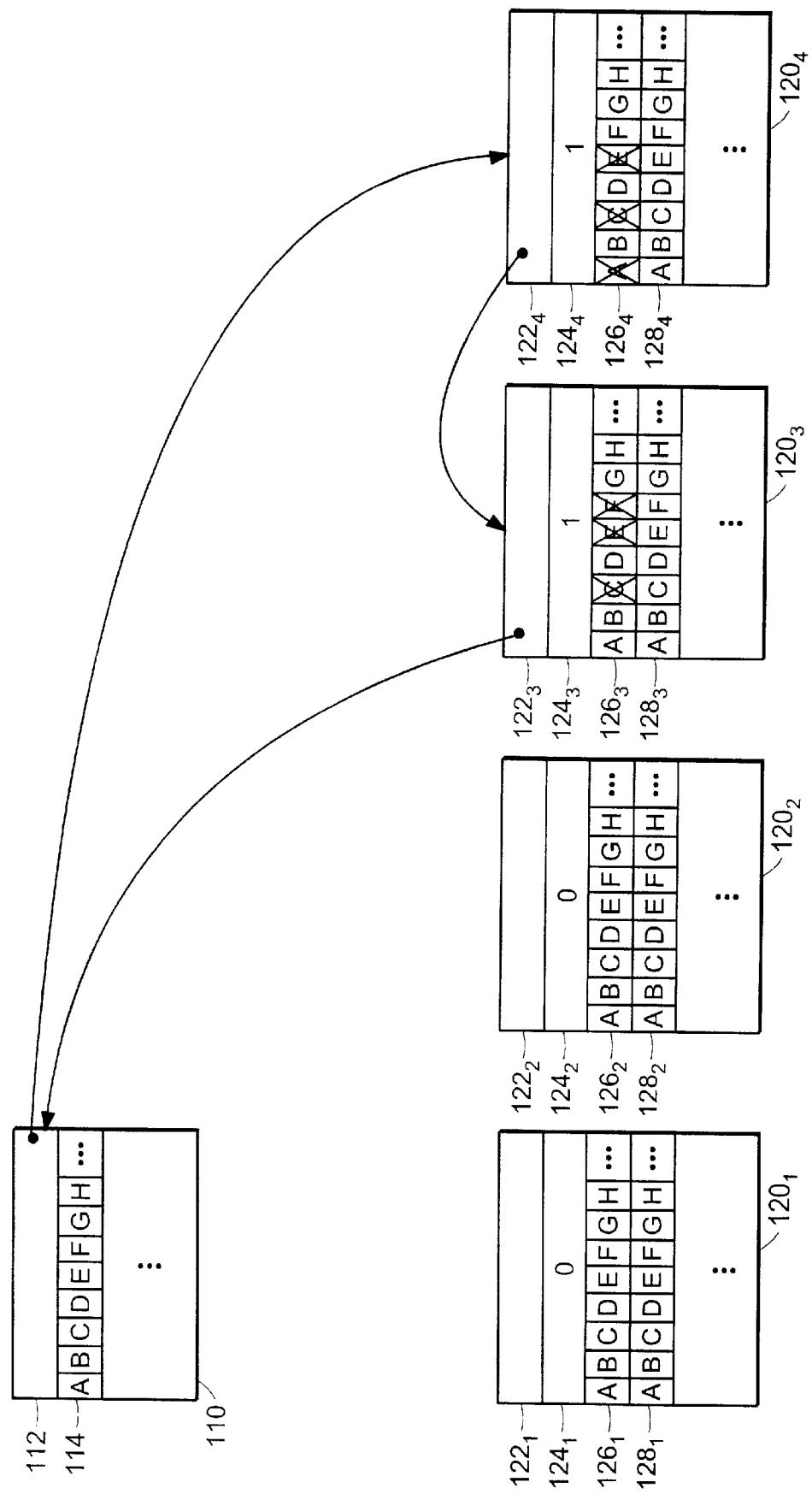

FIG. 7F illustrates a subsequent update to the database to generation 4. Of particular interest is the processing of the global erase list 114. Those pages (pages A, B, D) are reclaimed. As shown, generation 4 is modifying data from page F, which has been copied to page A. Page A is now allocated to generation 4.

Those of ordinary skill in the art that methods involved in a System For Controlling Database Growth in a Read-Repeatable Environment may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

While the system has been particularly shown and described with references to preferred embodiments thereof, it will be understood by those skilled in the art that various changes in form and details may be made therein without departing from the scope of the invention encompassed by the appended claims. For example, the methods of the invention can be applied to various read-repeatable database environment, and are not limited to the environment described herein.

What is claimed is:

1. A method for controlling database growth in a read-repeatable environment having a database comprising a plurality of pages of memory, the database concurrently supporting a plurality of active ordinal generations, each active generation represented by a respective plurality of allocated pages, the method comprising:

a) for each active generation of the database:

storing, in an allocation indicator, an indication of each page allocated in the active generation;

storing, in an erase indicator, an indication of each allocated page of the active generation updated by a subsequent generation;

b) determining an obsolete page from an erase indicator; and c) reclaiming the obsolete page for reuse by the database.

2. The method of claim 1 wherein the allocation indicator and the erase indicator are bitmaps.

3. The method of claim 1 wherein the allocation indicator and the erase indicator are stored in a control structure for the active generation.

4. The method of claim 1 wherein determining comprises:
merging the indication of an updated page from the erase indicator of an active generation with a global erase indicator.

5. The method of claim 1 wherein determining comprises:
merging the indication of an updated page from the erase indicator of an active generation with the erase indicator of an active ancestor generation.

6. The method of claim 1 further comprising de-activating an active generation when the number of accessors to the active generation equals zero.

7. The method of claim 1 wherein reclaiming comprises accessing the database to create a new generation of the database.

8. A method for controlling database growth in a read-repeatable environment having a database comprising a plurality of pages of memory, the database concurrently supporting a plurality of active ordinal generations, each active generation represented by a respective plurality of allocated pages, the method comprising:
a) in a generation control structure, for each active generation of the database:
storing, in an allocation field, an indication of each page allocated in the active generation;
storing, in a generation erase field, an indication of each allocated page of the active generation updated by a subsequent generation;
b) determining an obsolete page by merging the indication of an updated page from a generation erase field of an active generation with a global erase field; and
c) reclaiming the obsolete page for reuse by the database.

9. The method of claim 8 wherein the allocation field and the generation erase field are bitmaps.

10. The method of claim 8 wherein determining comprises:
merging the indication of an updated page from the generation erase field of an active generation with the generation erase field of an active ancestor generation.

11. The method of claim 8 wherein determining further comprises de-activating the active generation.

12. The method of claim 11 wherein the active generation is de-activated when the number of accessors to the active generation equals zero.

13. The method of claim 1 wherein reclaiming comprises accessing the database to create a new generation of the database.

14. A computer program product for controlling database growth in a read-repeatable environment having a database comprising a plurality of pages of memory, the database concurrently supporting a plurality of active ordinal generations, each active generation represented by a respective plurality of allocated pages, the product comprising:
a computer readable medium; and
a computer program imbedded in the medium, the program including computer instructions to:
a) for each active generation of the database:
store, in an allocation indicator, an indication of each page allocated in the active generation;
store, in an erase indicator, an indication of each allocated page of the active generation updated by a subsequent generation;
b) determine an obsolete page from an erase indicator; and
c) reclaim the obsolete page for reuse by the database.

15. The computer program product of claim 14 wherein the allocation indicator and the erase indicator are bitmaps.

16. The computer program product of claim 14 wherein the allocation indicator and the erase indicator are stored in a control structure for the active generation.

17. The computer program product of claim 14 wherein the instructions to determine comprises instructions to:
merge the indication of an updated page from the erase indicator of an active generation with a global erase indicator.

18. The computer program product of claim 14 wherein the instructions to determine comprises instructions to:
merge the indication of an updated page from the erase indicator of an active generation with the erase indicator of an active ancestor generation.

19. The computer program product of claim 14 further comprising instructions to de-activate an active generation when the number of accessors to the active generation equals zero.

20. The computer program product of claim 14 wherein the instructions to reclaim comprises instructions to access the database to create a new generation of the database.

21. A computer program product for controlling database growth in a read-repeatable environment having a database comprising a plurality of pages of memory, the database concurrently supporting a plurality of active ordinal generations, each active generation represented by a respective plurality of allocated pages, the product comprising:
a computer readable medium; and
a computer program imbedded in the medium, the program including computer instructions to
a) in a generation control structure, for each active generation of the database:
store, in an allocation field, an indication of each page allocated in the active generation;
store, in a generation erase field, an indication of each allocated page of the active generation updated by a subsequent generation;
b) determine an obsolete page by merging the indication of an updated page from a generation erase field of an active generation with a global erase field; and
c) reclaim the obsolete page for reuse by the database.

22. The computer program product of claim 21 wherein the allocation field and the generation erase field are bitmaps.

23. The computer program product of claim 21 wherein the instructions to determine comprises instructions to:
merge the indication of an updated page from the generation erase field of an active generation with the generation erase field of an active ancestor generation.

24. The computer program product of claim 21 wherein the instructions to determine further comprises instructions to de-activate the active generation.

25. The computer program product of claim 24 wherein the active generation is de-activated when the number of accessors to the active generation equals zero.

26. The computer program product of claim 21 wherein the instructions to reclaim comprises instructions to access the database to create a new generation of the database.

27. A system for controlling database growth in a read-repeatable environment having a database comprising a plurality of pages of memory, the database concurrently supporting a plurality of active ordinal generations, each active generation represented by a respective plurality of allocated pages, the system comprising:

a) for each active generation of the database:
   an allocation indicator having stored therein an indication of each page allocated in the active generation;
   an erase indicator having stored therein an indication of each allocated page of the active generation updated by a subsequent generation;
b) an obsolete page determined from an erase indicator; and
c) a mechanism to reclaim the obsolete page for reuse by the database.

28. The system of claim 27 wherein the allocation indicator and the erase indicator are bitmaps.

29. The system of claim 27 wherein the allocation indicator and the erase indicator are stored in a control structure for the active generation.

30. The system of claim 27 wherein the obsolete page is determined by merging the indication of an updated page from the erase indicator of an active generation with a global erase indicator.

31. The system of claim 27 wherein the obsolete page is determined by merging the indication of an updated page from the erase indicator of an active generation with the erase indicator of an active ancestor generation.

32. The system of claim 27 further comprising a mechanism to de-activate an active generation when the number of accessors to the active generation equals zero.

33. The system of claim 27 wherein the obsolete page is reclaimed in response to an access to the database to create a new generation of the database.

34. A system for controlling database growth in a read-repeatable environment having a database comprising a plurality of pages of memory, the database concurrently supporting a plurality of active ordinal generations, each active generation represented by a respective plurality of allocated pages, the system comprising:

a) in a generation control structure, for each active generation of the database:
   an allocation field having stored therein an indication of each page allocated in the active generation;
   a generation erase field having stored therein an indication of each allocated page of the active generation updated by a subsequent generation;
b) an obsolete page determined by merging the indication of an updated page from a generation erase field of an active generation with a global erase field; and
c) a mechanism to reclaim the obsolete page for reuse by the database.

35. The system of claim 34 wherein the allocation field and the generation erase field are bitmaps.

36. The system of claim 34 wherein the obsolete pages is determined by merging the indication of an updated page from the generation erase field of an active generation with the generation erase field of an active ancestor generation.

37. The system of claim 34 further comprising a mechanism to de-activate the active generation.

38. The system of claim 37 wherein the active generation is de-activated when the number of accessors to the active generation equals zero.

39. The system of claim 34 wherein reclamation mechanism is responsive to an access to the database to create a new generation of the database.

40. A control structure for managing a database in a read-repeatable environment, comprising:

a global control structure for managing a global view of the database, the global control structure including a global erase indicator having stored therein an indication of an obsolete page of the database; and a generation control structures linked with the global control structure for managing an ordinal generational view of the database, the generation control structure including a generation erase indicator having stored therein an indication of a page allocated to the generation updated by a subsequent generation.

41. The control structure of claim 40 wherein the generation control structure further includes an allocation indicator for identifying the pages allocated to the generation.

42. A system for controlling database growth in a read-repeatable environment having a database comprising a plurality of pages of memory, the database concurrently supporting a plurality of active ordinal generations, each active generation represented by a respective plurality of allocated pages, the system comprising:

a) in a generation control structure, for each active generation of the database:
   a means for storing, in an allocation indicator, an indication of each page allocated in the active generation;
   a means for storing, in an erase indicator, an indication of each allocated page of the active generation updated by a subsequent generation;
b) a means for determining an obsolete page from aerase indicator; and
c) a means for reclaiming the obsolete page for reuse by the database.

43. The method of claim 42 wherein the allocation field and the generation erase field are bitmaps.

44. The method of claim 42 wherein determining comprises:
   merging the indication of an updated page from the generation erase field of an active generation with the generation erase field of an active ancestor generation.

45. The method of claim 42 wherein determining further comprises de-activating the active generation.

46. The method of claim 45 wherein the active generation is de-activated when the number of accessors to the active generation equals zero.

47. The method of claim 42 wherein reclaiming comprises accessing the database to create a new generation of the database.

48. A method for controlling database growth in a read-repeatable environment having a database comprising a plurality of pages of memory, the database concurrently supporting a plurality of active ordinal generations, each active generation represented by a respective plurality of allocated pages, the method comprising:

a) in a global control structure, for managing a global view of the database:
   storing, in a bitmap field, a global erase indication of an obsolete page of the database;
b) in a generation control structure, for each active generation of the database:
   storing, in a bitmap field, an allocation indication of each page allocated in the active generation; and
   storing, in a bitmap field, a generation erase indication of each allocated page of the active generation updated by a subsequent generation;
c) determining an obsolete page by merging the generation erase indication of an updated page from a generation control structure of an active generation with a global erase indication of an obsolete page from a global control structure, including:
deactivating the active generation when the number of accessors to the active generation equals zero; and d) reclaiming the obsolete page for reuse by the database in response to an access to the database to create a new generation of the database.

49. A system for controlling database growth in a read-repeatable environment having a database comprising a plurality of pages of memory, the database concurrently supporting a plurality of active ordinal generations, each active generation represented by a respective plurality of allocated pages, the system comprising:

a) for each active generation of the database:
an allocation indicator, in a bitmap field, storing an indication of each page allocated in the active generation;
an erase indicator, in a bitmap field, storing an indication of each allocated page of the active generation updated by a subsequent generation;

b) an obsolete page determined from an erase indicator, including:
a mechanism to determine an obsolete page by merging the indication of an updated page from the erase indicator of an active generation with a global erase indicator, in a bitmap field; and c) a mechanism to reclaim the obsolete page for reuse by the database, including:
a mechanism to reclaim the obsolete page in response to an access to the database to create a new generation of the database.

* * * * *

UNITED STATES PATENT AND TRADEMARK OFFICE
CERTIFICATE OF CORRECTION

PATENT NO. : 6,584,475 B1
DATED : June 24, 2003
INVENTOR(S) : James E. Carey, Charles P. Venezia, Jr. and Albert Hopeman It is certified that error appears in the above-identified patent and that said Letters Patent is hereby corrected as shown below:

Column 10,
Line 5, delete "structures" and insert -- structure --.
Line 28, delete "aerase" and insert -- an erase --.
Lines 32, 34, 40, 42 and 45, delete "method" and insert -- system --.

Signed and Sealed this

Twenty-fifth Day of April, 2006

JON W. DUDAS
*Director of the United States Patent and Trademark Office*